(12) United States Patent
Sherry et al.

(10) Patent No.: US 11,447,420 B2
(45) Date of Patent: Sep. 20, 2022

(54) METHOD OF TREATMENT OF BAUXITE RESIDUE, SOLID OBTAINED BY THIS METHOD AND BAUXITE TREATMENT PROCESS INCLUDING THIS METHOD OF TREATMENT OF THE BAUXITE RESIDUE

(71) Applicant: PURGO GROUP LIMITED, Essex (GB)

(72) Inventors: James Patrick Sherry, Cheshire (GB); John Bowles, Creysse (FR); David Shanahan, Kildare (IE); Stephen Jennings, Cheshire (GB); Geoffrey Salt, Yorkshire (GB)

(73) Assignee: PURGONPL GROUP LIMITED, Essex (GB)

( * ) Notice: Subject to any disclaimer, the term of this patent is extended or adjusted under 35 U.S.C. 154(b) by 765 days.

(21) Appl. No.: 16/623,589

(22) PCT Filed: Dec. 15, 2016

(86) PCT No.: PCT/GB2016/053946
§ 371 (c)(1),
(2) Date: Dec. 17, 2019

(87) PCT Pub. No.: WO2017/103594
PCT Pub. Date: Jun. 22, 2017

(65) Prior Publication Data
US 2020/0181024 A1    Jun. 11, 2020

(30) Foreign Application Priority Data

Dec. 15, 2015 (GB) .................... 1522152

(51) Int. Cl.
*C04B 33/04* (2006.01)
*C01F 7/066* (2022.01)
(Continued)

(52) U.S. Cl.
CPC .............. *C04B 33/04* (2013.01); *B09B 3/25* (2022.01); *C01F 7/066* (2013.01); *C03C 14/00* (2013.01);
(Continued)

(58) Field of Classification Search
CPC ... C04B 33/04; C04B 33/131; C04B 33/1315; C04B 33/1322; C04B 33/32;
(Continued)

(56) References Cited

FOREIGN PATENT DOCUMENTS

CN          103319150 A   *  9/2013   ............ Y02W 30/58

OTHER PUBLICATIONS

Badanoiu et al. Preparation and characterization of foamed geopolymers from waste glass and red mud. Construction and Building Materials vol. 84, Jun. 1, 2015, pp. 284-293.*
(Continued)

*Primary Examiner* — Noah S Wiese
(74) *Attorney, Agent, or Firm* — Whiteford, Taylor & Preston, LLP; Gregory M. Stone

(57) ABSTRACT

A method of treatment of bauxite residue resulting from a Bayer process of bauxite treatment in order to produce a solid product. The method comprises mixing a quantity of the bauxite residue (1) with a quantity of a glass material (2) to form a mixture. Then, compressing the mixture (4) to form a green body, and sintering (5) the green body. After cooling, the sintered green body thereby provides the solid product.

12 Claims, 10 Drawing Sheets

(51) Int. Cl.
   *C03C 14/00* (2006.01)
   *C04B 33/13* (2006.01)
   *C04B 33/132* (2006.01)
   *C04B 33/32* (2006.01)
   *B09B 3/25* (2022.01)

(52) U.S. Cl.
   CPC ........ *C04B 33/131* (2013.01); *C04B 33/1315* (2013.01); *C04B 33/1322* (2013.01); *C04B 33/32* (2013.01); *C03C 2214/14* (2013.01); *C03C 2214/30* (2013.01); *C04B 2235/3217* (2013.01); *C04B 2235/36* (2013.01); *C04B 2235/604* (2013.01); *C04B 2235/656* (2013.01)

(58) Field of Classification Search
   CPC .......... C04B 2235/36; C04B 2235/604; C03C 14/00; C03C 2214/14
   See application file for complete search history.

(56) References Cited

OTHER PUBLICATIONS

He et al. Preparation and mechanism of the sintered bricks produced from Yellow Riversilt and red mud. Journal of Hazardous Materials 203-204 (2012) 53-61.*

He et al. The effect of incorporation of red mud on the properties of clay ceramic bodies. Applied Clay Science vol. 70, Dec. 2012, pp. 67-73.*

* cited by examiner

METHOD OF TREATMENT OF BAUXITE RESIDUE, SOLID OBTAINED BY THIS METHOD AND BAUXITE TREATMENT PROCESS INCLUDING THIS METHOD OF TREATMENT OF THE BAUXITE RESIDUE

FIELD

The present invention relates to the treatment of bauxite residue, and to the production of solid products therefrom. The present invention also relates to the manufacture of building products such as bricks, tiles, building panels and other materials such as high-performance aggregates, aggregates, railway ballast etc. from the treatment of bauxite residue.

BACKGROUND

Bauxite residue, commonly known in the art as 'red mud', is a solid waste by-product generated during the Bayer process for the production of alumina from laterites. The Bayer process is the principal industrial means of refining bauxite to produce alumina. Alumina is the main raw material for the production of aluminium worldwide (e.g. by the Hall-Heroult process). Over 95% of alumina production is via the Bayer process.

A typical bauxite processing plant may produce up to twice as much red mud as alumina when using the Bayer process. The proportion of red mud produced depends upon the mineralogy and/or geographical origin of the bauxite together with the particular extraction conditions used in the Bayer process. A general trend shows that increasingly, a lower quality bauxite is being refined to produce alumina as the quality/quantity of worldwide stocks of bauxite fall. The result is that increasingly more bauxite residue is produced per tonne of alumina produced.

Red mud comprises mixture of solid and metallic oxide-bearing impurities. The red colour is caused, for example, by the oxidised iron present within it. The pH value of red mud can range typically from 10 to 13. This highly alkaline pH can have a damaging impact on the environment.

Red mud presents a significant disposal problem since it cannot be disposed of easily. Typically, it is simply pumped, as a slurry, into holding ponds (lagoons) where it is maintained indefinitely. Such red mud in lagoons is liable to dry and produce airborne dust particles which cannot easily be contained. As a consequence, red-mud lagoons are kept moist. Furthermore, if not kept in a water-tight holding area, the leachate from the red mud may contaminate the water table.

Estimates of the cumulative quantity of red mud worldwide indicate up to 3 giga tonnes. Furthermore, estimates of the rate of production of bauxite residue suggest a current rate of approximately 140 mega tonnes per annum, and increasing given increasing worldwide demands for aluminium.

The invention aims to address these matters.

SUMMARY

In a first aspect, the invention provides a method of treatment of bauxite residue resulting from the treatment of bauxite by the Bayer process in order to produce a solid product, the method comprising: mixing a quantity of the bauxite residue with a quantity of a glass material to form a mixture; compressing the mixture to form a green body; sintering the green body (e.g. preferably at a temperature sufficient to melt the glass material); and, cooling the sintered green body thereby to produce the solid product. This has been found to provide a solid body in which is less hazardous than is the bauxite residue used to make it. The term 'hazardous' may be defined according to the Waste Acceptance Criteria Testing standard BS EN 12457.

TABLE 1

Landfill Waste Acceptance Criteria
(BS EN 12457-3 Limit Values (mg/kg) at L:S 10:1)

| Element | Insert Waste (mg/kg) | Stable Non-Reactive hazardous waste and non-hazardous waste codisposed with SNRHW (mg/kg) | Hazardous Waste (mg/kg) | *Unsuitable for Waste disposal MUST be processed (mg/kg) |
|---|---|---|---|---|
| Arsenic as As | 0.5 | 2 | 25 | >25 |
| Barium as Ba | 20 | 100 | 300 | >300 |
| Cadmium as Cd | 0.04 | 1 | 5 | >5 |
| Chromium as Cr | 0.5 | 10 | 70 | >70 |
| Copper as Cu | 2 | 50 | 100 | >100 |
| Mercury as Hg | 0.01 | 0.2 | 2 | >2 |
| Molybdenum as Mo | 0.5 | 10 | 30 | >30 |
| Nickel as Ni | 0.4 | 10 | 40 | >40 |
| Lead as Pb | 0.5 | 10 | 50 | >50 |
| Antimony as Sb | 0.06 | 0.7 | 5 | >5 |
| Selenium as Se | 0.1 | 0.5 | 7 | >7 |
| Zinc as Zn | 4 | 50 | 200 | >200 |
| Chloride as $Cl^-$ | 800 | 15000 | 25000 | >25000 |
| Fluoride as F | 10 | 150 | 500 | >500 |
| Sulphate as $SO_4^{2-}$ | 1000 | 20000 | 50000 | >50000 |
| Total Dissolved Solids (TDS) | 4000 | 60000 | 100000 | >100000 |
| Phenol Index | 1 | | | |
| Dissolved Organic Carbon (DOC) | 500 | 800 | 1000 | >1000 |

*Column added by applicant - material exceeding the WAC test threshold for 'hazardous waste' by definition must be processed in order to be accepted for land-fill disposal.

These Waste Acceptance Criteria (VVAC) are those required to be satisfied prior to disposal of a waste product at a landfill site, and they provide a useful objective method of defining, and discussing, the hazard reduction in bauxite residue achievable according to the present invention.

It is to be understood that the present invention need not satisfy the WAC Testing standard BS EN 12457 in terms of reducing bauxite residue from being described as 'Hazardous' to something non-hazardous (e.g. 'Inert Waste'), but it has been found that the present invention may at least reduce the number of the component elements within bauxite residue which would otherwise be classed as 'Hazardous', and may, in preferred embodiments, render bauxite waste wholly non-hazardous ('Inert') according to the WAC Testing standard BS EN 12457.

In a preferred embodiment, the solid product may be stable (e.g. 'Stable non-reactive hazardous waste and non-hazardous waste co-disposed with SNRHW' according to BS EN 12457) in respect of its content of one or more (or all) of the following materials: arsenic, mercury, molybdenum, chromium, lead, cadmium, selenium, chloride. Stable non-reactive hazardous waste and non-hazardous waste co-disposed with SNRHW' is sometimes termed 'Stable non-reactive/non-hazardous'.

In a preferred embodiment, the solid product may be inert (e.g. 'Inert Waste' according to BS EN 12457) in respect of its content of one or more (or all) of the following materials: arsenic, mercury, molybdenum, chromium, lead, cadmium, selenium, chloride.

Preferably the mixture is in an aqueous liquid form, such as a slurry. The glass material may be added to the bauxite residue when the bauxite residue is in an aqueous liquid form, such as a slurry. The glass may be added in particulate form (e.g. ground glass). The ground glass may comprise particles of mean particle diameter not exceeding about 100 µm (e.g. less than 75 µm). The glass material may comprise a silicate glass, which may optionally also comprise borosilicate glass. For example, the silicate glass may be a soda-lime glass. This may be, but is not limited to, post-consumer glass. Soda-lime glass (sometimes referred to in the abbreviated form: "soda glass") is the most common form of glass produced. It is composed of about 65%-75% silica (silicon dioxide, $SiO_2$), about 12%-18% soda (sodium oxide, $Na_2O$), and about 5%-12% lime (calcium oxide, CaO), with much smaller amounts of various other compounds. The soda serves as a flux to lower the temperature at which the silica melts, and the lime acts as a stabilizer for the silica. Soda-lime glass is inexpensive, chemically stable, reasonably hard, and extremely workable because it is capable of being re-softened a number of times.

The sintering process allows the atoms in the materials within the green body to diffuse across the boundaries of the particles, fusing the particles together and creating one solid piece. It is postulated (but not asserted) that the glass added within the mixture used to form the green body, assists this fusion. It may intimately fuse with component materials of the bauxite residue to render them less hazardous. It postulated that molten glass material may flow into voids within the green body thereby enhancing the interaction with bauxite residue particle/grains. Such mass movements may reduce the total porosity of the sintered solid product. Material transport may occur due to evaporation and condensation from diffusion. Metal atoms may move along crystal boundaries to the walls of internal pores, redistributing mass from the internal bulk (bauxite residue) of the object and entering pores where molten glass may be present. Surface tension may be the driving force for this movement. In addition there may be mineralogical changes, re-crystallising pre-existing minerals to form larger, higher temperature and higher pressure phases due to the sintering and compression.

The temperature of sintering may be a temperature of between about 800° C. and about 1400° C. The temperature of sintering may be adjusted according to the composition and mineralogy of the bauxite residue, so as to optimise the treatment process as desired. It has been found that with increasing sintering temperature, the amorphous glass content of the resulting solid product increases and the content of hematite within the resulting solid product falls significantly as compared to the hematite content of the bauxite residue within the pre-sintered green body. Preferably, the sintering temperature is a temperature of at least about 1100° C., and may be a temperature of between about 1100° C. and about 1400° C. During the sintering stage, it has been found that the conversion into an amorphous glass of the hematite content within the bauxite residue component of the green body, is significantly enhanced at such sintering temperatures. The amorphous glass resulting from this has been found to assist in improving the strength, durability and quality of the solid product resulting from the treatment process.

The sintering may take place for a period of time of between about ½ an hour and about 12 hours. The period of time may be varied according to the mass of the green body resulting from the compression step, and/or the volume/size of the green body resulting from the compression step. For example, the green body resulting from the compression step may comprise a pellet having a mass of between about 20 g and about 100 g, and the sintering period of time may be between about ½ an hour and about 2 hours, accordingly. For a larger or more massive green body the sintering period of time may be concomitantly longer. For example, the green body resulting from the compression step may comprise a brick (or briquette-like item) having a mass of between about 100 g and about 500 g, and the sintering period of time may be between about 2 hour and about 12 hours, accordingly. The smaller the brick (e.g. briquette-like; e.g. about 100 g to about 200 g in mass) then the shorter the sintering time period required (e.g. about 2 hours to about 4 hours), and the larger the brick (e.g. about 200 g to about 500 g) the longer the sintering time (e.g. about 4 hours to about 12 hours). The sintering time period may be adjusted according to the composition and mineralogy of the bauxite residue, so as to optimise the treatment process as desired. For example, the sintering time period may be adjusted according to the quantity or proportion of the mineral iron oxide within the bauxite residue (Explanation: hematite gives the red colour which is lost after sintering so it is postulated that hematite present is changed to a less oxidised iron oxide such as magnetite while goethite (iron hydroxide) is also likely to be modified).

The step of compressing preferably comprises compressing the mixture under a compressive pressure of a least about 10 MPa. The compressive pressure may be a pressure within the range from about 10 MPa to about 400 MPa. For example, the compressive pressure may be equal to or greater than about 10 MPa, or about 15 MPa, or about 20 MPa, or about 30 Mpa or about 50 MPa, or about 100 MPa, or about 200 MPa, or about 300 MPa, or about 400 MPa. For example, the compressive pressure may be equal to or less than about 10 MPa, or about 15 MPa, or about 20 MPa, or about 30 Mpa or about 50 MPa, or about 100 MPa, or about 200 MPa, or about 300 MPa, or about 400 MPa. The compressive pressure may be within a range of pressures having lower and upper limits selected, respectively, from any one the above examples. The compressive pressure may be applied by pressing a quantity of the mixture. It may be applied by placing a quantity of the mixture in a mould and pressing the mixture within the mould. This may produce a shaped green body, ready for sintering.

It has been found that the appropriate compression of the mixture of glass material and bauxite residue, to form the green body, can enhance the ability of the treatment to provide a solid product that is less hazardous than bauxite residue. It is believed that the act of compression reduced the porosity of the green body, which results from the compression, and thereby increases the interface/contact between the added glass material and the bauxite residue within the green body. This, it is believed, may improve the efficacy with which these two constituent materials interact during the sintering process, to render the resulting solid product less hazardous than the initial bauxite residue.

If the mixture is in an aqueous liquid form, such as a slurry, preferably the mixture slurry is de-watered under pressure to produce a compacted or compressed cake from which the green body is formed, or which directly provides the green body. The mixture slurry may be de-watered using a filter press for solid/liquid separation processing using pressure. The filter press may be arranged to drive the mixture slurry into the filter press under a pressure of between about 2.5 atm and about 4 atm. The result is to squeeze out water from the slurry, leaving behind a compacted, compressed body of de-watered material known in the art as "cake" or "filter cake".

The method may include manipulating the cake material to form a green body, or a multitude of green bodies. This may comprise forcing the cake material through an extrusion nozzle of an extruder apparatus. Cake is subjected to compression pressure in the process. The extruded, compacted cake may then be cut into portions each defining a green body for sintering. A rotary cutter may be positioned adjacent the extrusion nozzle outlet for cutting the extruded cake output therefrom, this purpose.

The manipulation of the cake material may comprise placing the cake on a conveyor and conveying the raw cake to a cutter for cutting the cake into portions of desired size and shape. Each cut portion thereby may provide a green body for sintering. The cutting may be implemented by cutting the cake material using one or more cutter blades each arranged over a conveyor to execute a reciprocating motion to cut conveyed cake material into portions. Alternatively, a rotating cutter wheel may be employed comprising a circular wheel positioned above a conveyor surface such that cake material is conveyed thereunder by the conveyer. The circumference of the rotary cutter wheel may present a series of radially extending cutting edges or blades arranged in regular array therealong. These cutting edges may be dimensioned so as periodically to osculate with the conveyor surface as the rotary blade is rotated in use. Preferably, the osculating cutting edge is controlled to have a velocity substantially matching that of the conveyor surface bearing the cake material.

A spacing between neighbouring cutting edges may be provides so as to define a recessed volume defining a mould or press for accommodating portions of the conveyed cake material. The mould/press may thereby both cut and press the cake material. A cutting edge of the rotating cutter may be a closed edge defining a closed perimeter surrounding the recessed volume.

Any of these cutting operations may be applied to extruded cut cake material, or raw cake material direct from a filter press.

The quantity of bauxite residue is preferably between about 90% by weight and about 99.5% by weight of the resulting mixture, on a dry weight basis of the resulting mixture. The quantity of glass material is preferably between about 10% by weight and about 0.5% by weight of the resulting mixture, on a dry weight basis of the resulting mixture.

The glass material may comprise glass grains of median particle size/diameter not exceeding about 200 µm, or more preferably of median particle size not exceeding about 100 µm, or more preferably of median particle size not exceeding about 75 µm, or yet more preferably of median particle size not exceeding about 65 µm. This control of glass particle size helps enhance the intimate mixture to be preferably formed between the added glass grains and the bauxite residue to which it is added. The median particle size may be measured using a laser diffraction instrument such as is readily available to the skilled person for such a purpose, or may be controlled using particle sieving techniques in the art (e.g. controlling/applying an appropriate sieve gauge to remove unsuitable particles/sizes).

The method may include forming an aqueous paste comprising the mixture, wherein the bauxite residue and the quantity of glass material are substantially homogeneously mixed throughout the paste, and the compressing comprises compressing the aqueous paste. This provides an intimate mixture of bauxite residue grains and grains of the glass material, which in turn enhances the interaction between the two according to the processes that occur during sintering which result in a solid product of lower environmental hazard level than is associated with untreated bauxite residue.

The method may include mixing a quantity of fines with the quantity of bauxite residue and the quantity of glass material thereby to form the mixture, wherein the fines are a result of crushing a said solid product. In this way, the result of the treatment can itself be used as an ingredient to the self same treatment of subsequent quantities of bauxite residue. The solid product resulting from this treatment has been found to comprise a higher proportion of amorphous, glassy material (relative to untreated bauxite residue) which has been found to be suitable in aiding the treatment process itself.

The quantity of bauxite residue may be between about 90% by weight and about 95% by weight of the resulting mixture on a dry weight basis of the resulting mixture, and the quantity of glass material and fines may be comprised within the material making up the rest of the mixture. The quantity of the glass material may be between about 10% by weight and about 0.5% by weight of the resulting mixture, and the quantity of fines may be between about 10% by weight and about 1% by weight of the resulting mixture on a dry weight basis of the resulting mixture, and the quantity of bauxite residue may be comprised within the material making up the rest of the mixture.

The method may comprise mixing a quantity of lime (CaO) with the quantity of bauxite and the quantity of glass material thereby to form the mixture.

The quantity of lime may be substantially pure lime, if desired, or more commonly may be a lime-rich material. A suitable and readily-available source of lime for providing the quantity of lime for this purpose, is ash (e.g. fly ash) resulting from air pollution control processes, such as Air Pollution Control Residues (APCR). These residues are the result of e.g. municipal solid waste incineration whereby large volumes of ash and fly ash residues are created and captured by air pollution control (APC) systems. Air-Pollution-Control (APC) residues from waste incineration facilities exist in a number of different varieties depending on the type of incinerator and the type of flue gas cleaning equipment installed. The chemical composition of the residues also depends on the waste incinerated. Typically, however, APC residues are a very fine grained powder. There are two main types of APC systems: i) wet lime injection and ii) dry or semi-dry lime injection. In these systems, lime is injected into the incinerator flue gas, either in dry form or as a slurry. This is done to neutralize acidic components in the flue gas. Fly ash, reaction products, and unreacted lime is typically removed in filters. In general, APC residues from municipal solid waste incineration consist of ash, carbon and significant quantities of unreacted lime. Thus, excess lime is present in the APC residues.

The incineration of municipal wastes produces residues that are typically contaminated with harmful compounds. Due to the extremely high temperatures at which the incineration of municipal solid wastes occur (typically about 1000° C.), there is virtually complete dissociation of organic compounds and volatilization of some metal species. Leachates from these residues may contain high concentrations of salts and trace metals including (but not limited to) aluminium, lead, chromium and zinc. Chlorides can account for a significant soluble fraction of this fly ash. Accordingly, APCR fly ash poses a contamination risk if it is disposed in contact with ground water. Fly ash is considered to be a hazardous (or worse) waste, requiring storage in underground abandoned mines, or in special landfill sites. Fly ash may be treated prior to disposal if it is to be disposed of as a non-hazardous material, however, there is a lack of environmentally acceptable means to dispose of APCRs. Thus, the use of APCRs to provide a quantity of lime (albeit from an impure source) in the present invention, may provide a means to dispose of contaminants in APCRs by encapsulating them in the resulting solid product produced by the treatment process described herein. The aforesaid mixing of a quantity of lime (CaO) with the quantity of bauxite and the quantity of glass material may thereby form the aforesaid mixture, which is thus also combined with remaining contaminants/components (e.g. ash, metals etc.) from APCRs. The addition of lime may help with some sources of bauxite residue as it may form complexes with some heavy metals (including arsenic) and this may assist in reducing the quantity of such heavy metals to inert levels within the product of the process described herein.

The quantity of bauxite residue may be between about 85% or 90% by weight and about 99.5% by weight of the resulting mixture and the quantity of glass material and lime combined may be between about 10% or 15% by weight and about 0.5% by weight of the resulting mixture, on a dry weight basis of the resulting mixture. The quantity of lime may be between about 0.5% by weight and about 5% by weight of the resulting mixture on a dry weight basis of the resulting mixture. The quantity of glass material may be between about 1% by weight and about 10% or 15% by weight of the resulting mixture on a dry weight basis of the resulting mixture.

The quantity of bauxite residue may be between about 85% or 90% by weight and about 95% by weight of the resulting mixture, with the glass material, fines and lime comprised within the rest of the mixture, on a dry weight basis of the resulting mixture. The quantity of glass material may be between about 10% or 15% by weight and about 0.5% by weight of the resulting mixture, and the quantity of lime may be between about 0.5% by weight and about 5% by weight of the resulting mixture, and the quantity of fines may be between about 10% by weight and about 1% by weight of the resulting mixture on a dry weight basis of the resulting mixture. The bauxite residue may make up the rest of the mixture.

In a second aspect, the invention may provide a process of bauxite treatment comprising: receiving bauxite; measuring the proportion of one or more target substance(s) within the chemical composition of the received bauxite, the target substance(s) being a substance(s) selected from: arsenic (As), mercury (Hg), molybdenum (Mo), chromium (Cr), lead (Pb), cadmium (Cd), selenium (Se), chloride (Cl); processing the received bauxite according to a Bayer process of bauxite treatment and therefrom producing a bauxite residue; treating the bauxite residue according to the method of treatment described above, wherein the quantity of a glass material, and/or the sintering temperature, and/or the sintering period of time are determined according to the measured proportion of the one or more target substances (e.g. elements) within the chemical composition of the received bauxite.

The quantity of glass material is preferably determined according to the measured proportion of the one or more target substances within the chemical composition of the received bauxite. The compression pressure applied to form the green body and/or the sintering temperature and/or the sintering time period may be determined according to the measured proportion of the one or more target substances within the chemical composition of the received bauxite.

The quantity of fines is preferably determined according to the measured proportion of the one or more target substances within the chemical composition of the received bauxite. The quantity of lime is preferably determined according to the measured proportion of the one or more target substances within the chemical composition of the received bauxite.

In a third aspect, the invention may provide a solid product produced according to a method according to the invention in its first aspect as described above, or according to the process of the invention in its second aspect as described above. The solid product may be stable (e.g. 'Stable non-reactive hazardous waste and non-hazardous waste co-disposed with SNRHW' according to BS EN 12457) in respect of its content of one or more (or all) of the following materials: arsenic, mercury, molybdenum, chromium, lead, cadmium, selenium, chloride. The solid product may be inert (e.g. 'Inert Waste' according to BS EN 12457) in respect of its content of one or more (or all) of the following materials: arsenic, mercury, molybdenum, chromium, lead, cadmium, selenium, chloride.

The term 'glass' refers to a solid that possesses a non-crystalline (i.e., amorphous) structure and that exhibits a glass transition when heated towards the liquid state.

The term 'green body' refers to an object the main constituent of which is weakly bound particulate material (e.g. ceramic material), which may be in the form of bonded or compressed powder or grains, before it has been sintered. This is a common term used by those skilled in the art.

The term 'about' when used in this specification refers to a tolerance of ±10%, of the stated value, i.e. about 50% encompasses any value in the range 45% to 55%, In further embodiments 'about' refers to a tolerance of ±5%, ±2%, ±1%, ±0.5%, ±0.2% or 0.1% of the stated value.

DESCRIPTION OF EMBODIMENTS

Figure 1:
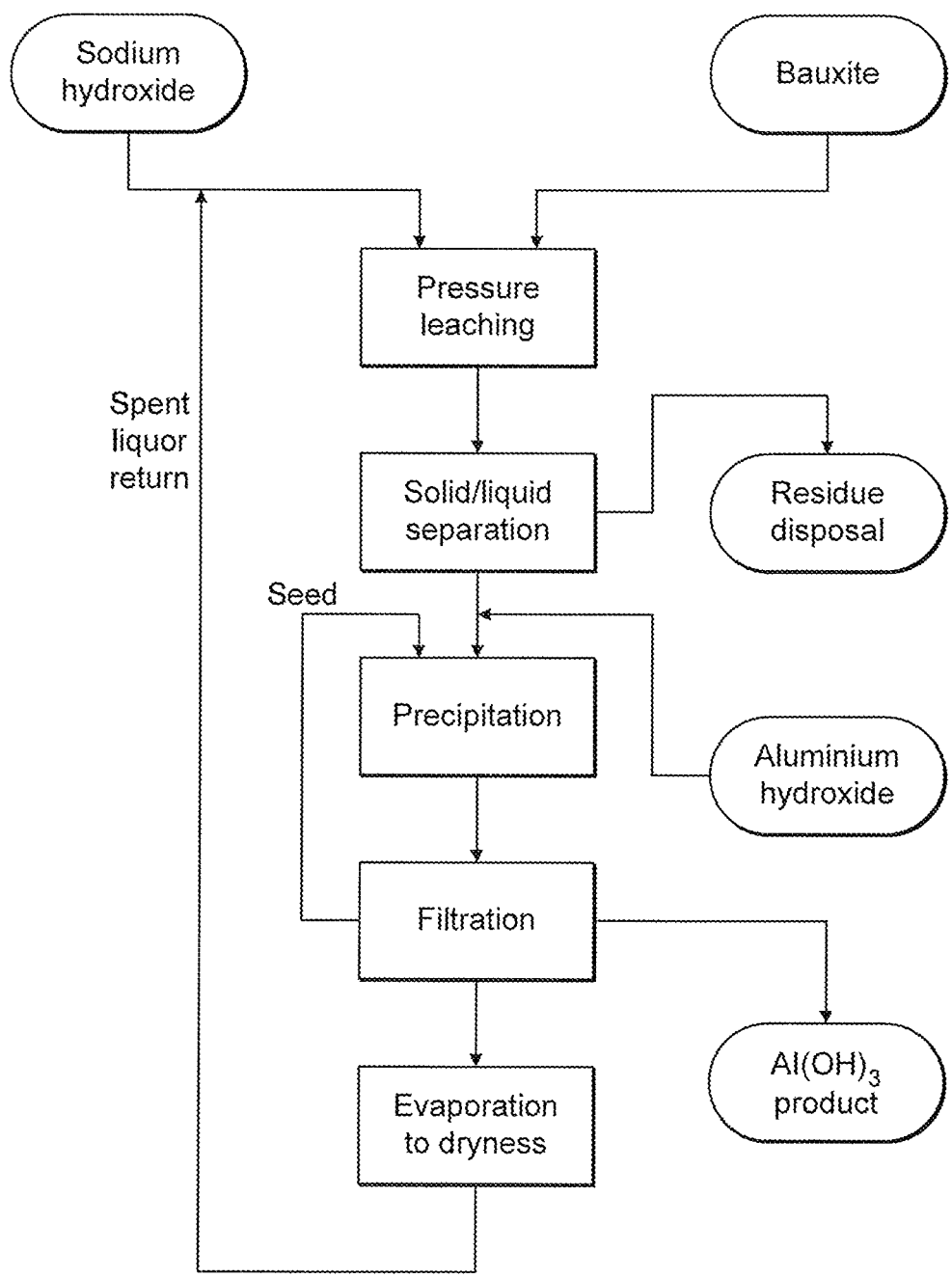
FIG. 1 schematically illustrates the principal processing steps in the Bayer process for the production of alumina from bauxite.

FIG. 1 schematically illustrates the main treatment steps in the well-known Bayer process for processing bauxite in order to produce alumina. The process starts with the provision of raw bauxite material. This is extracted using a quantity of sodium hydroxide in a pressure leaching process at elevated temperature. The output of the pressure/elevated temperature leaching process is sodium aluminate. The mixture is subjected to a process of solid/liquid separation which produces a solid (slurry) bauxite residue (red mud) which must be disposed of or managed as a waste produce according to current processing methods in the art. Also produced by the solid/liquid separation process is a quantity of useable sodium aluminate liquid to which aluminium hydroxide crystals are added and the mixture allowed to cool which results in a further quantity of aluminium hydroxide precipitating from the mixture. The solid is then separated from the spent sodium aluminate liquor by filtration. The output of this filtration process is aluminium hydroxide [Al(OH)$_3$], and this may then be sold as is, or dried or calcined to aluminium oxide. The spent liquor is fed-back into the process, mixed with bauxite and the process repeated. Additional quantities of sodium hydroxide may be added. It is by this basic Bayer process that bauxite residue is produces in great quantities.

Figure 3:
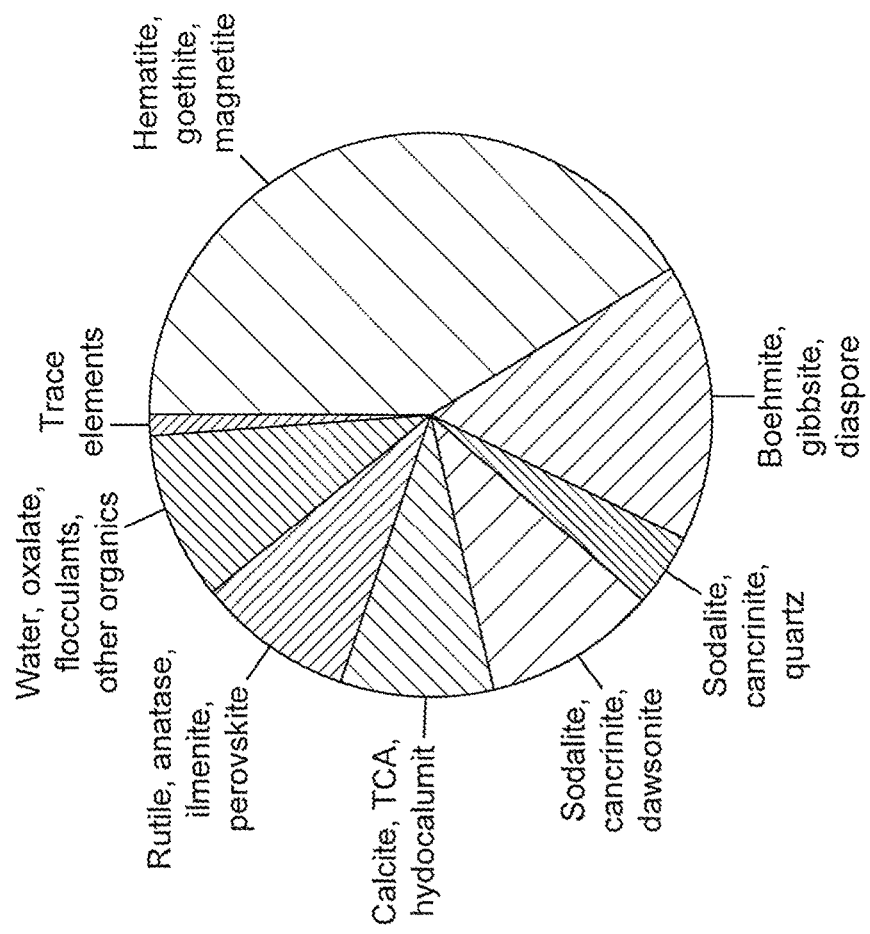
FIG. 3 graphically illustrates the typical mineral composition of bauxite residue produced as a by-product of the Bayer process of FIG. 1.
Figure 2:
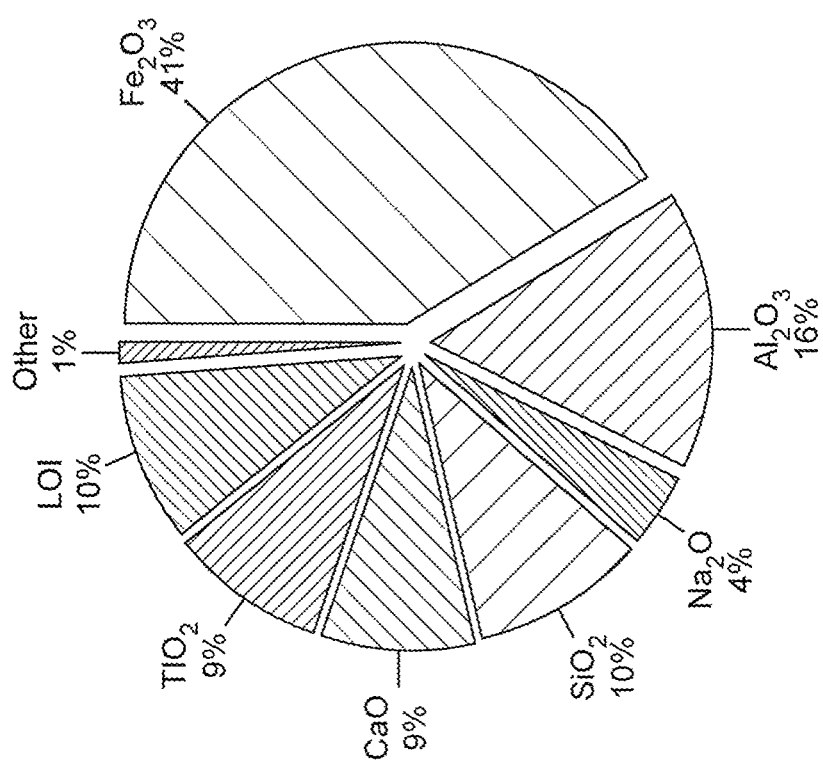
FIG. 2 graphically illustrates the typical chemical composition of bauxite residue produced as a by-product of the Bayer process of FIG. 1.

The 'average' chemical and 'average' mineralogical compositions of bauxite residue are graphically illustrated in FIGS. 2 and 3. The abbreviation LOI refers to 'Lost On Ignition' and represents organic and inorganic carbon and water that may be chemically bound in the constituent minerals. Much, or most, of the sodium and much/most of the calcium are present as a result of the treatment of the original bauxite by caustic soda and lime in the Bayer process described above. Chemical compositions are typically determined by a well-known process of X-ray fluorescence (XRF) such as is well known and readily available to the skilled person. Mineralogical compositions are typically determined by a well-known process of powder X-ray diffraction (powder-XRD) such as is well known and readily available to the skilled person.

The chemical and mineralogical compositions of any given bauxite residue depends sensitively upon the mineralogy of the geological location from which the initial bauxite was mined, as well as the specific parameters employed in the Bayer process applied to that bauxite resulting in the bauxite residue in question. Composition depends on the mineralogy of the original rocks and the climatic regime that has induced the alteration processes described as laterisation to form what is referred to as the 'initial bauxite'

The present invention preferably applies to bauxite residues comprising the following generic chemical specification for its major constituents:

Fe$_2$O$_3$—about 15% to about 55%
Al$_2$O$_3$—about 10% to about 30%
TiO$_2$—about 4% to about 20%
CaO—about 0% to about 14%
SiO$_2$—about 3% to about 30%
Na$_2$O—about 0.5% to about 10%

Additionally, the major mineralogical constituents preferably could normally be:

Sodalite—about 4% to about 40%
Goethite—about 10% to about 30%
Hematite—about 10% to about 30%
Magnetite—about 0% to about 8%
Silica (crystalline and amorphous)—about 3% to about 20%
Calcium aluminate—about 2% to about 20%
Boehmite—about 0% to about 20%
Titanium dioxide, anatase and rutile—about 2% to about 15%
Muscovite—about 0% to about 15%
Calcite—about 2% to about 20%
Kaolinite—about 0% to about 5%
Gibbsite—about 0% to about 5%
Perovskite—about 0% to about 12%
Cancrinite—about 0% to about 50%
Diaspore—about 0% to about 5%

Figure 4:
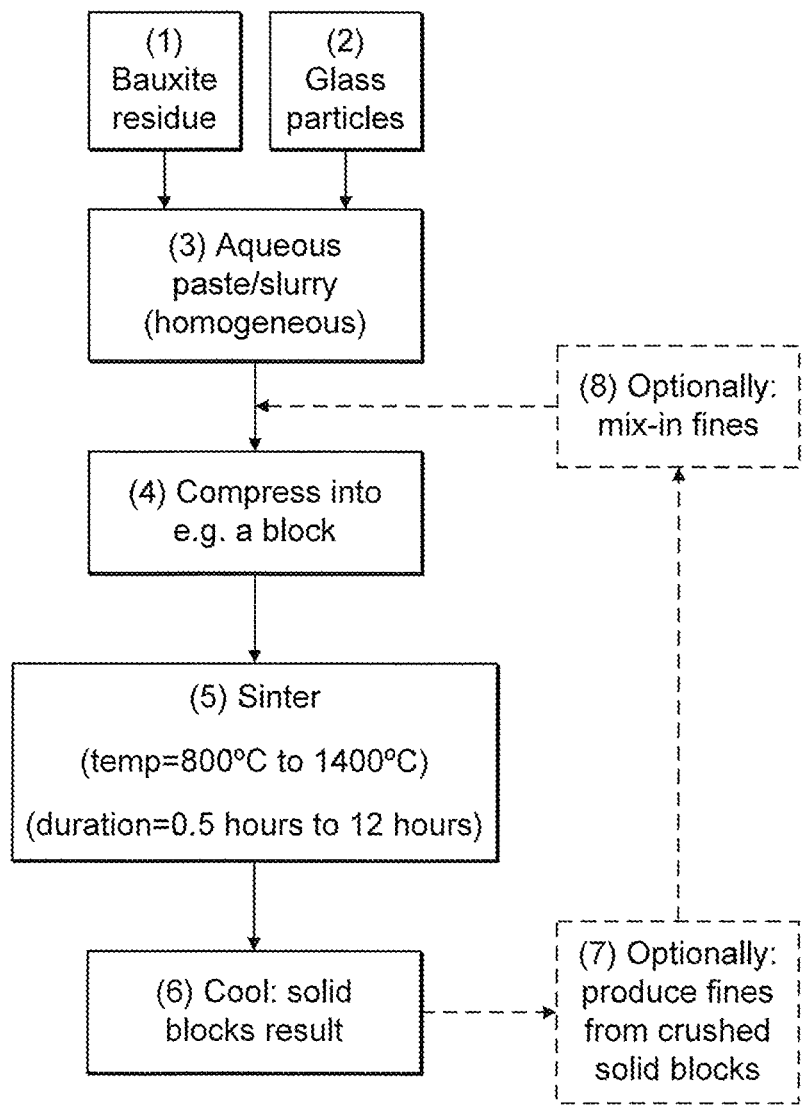
FIG. 4 schematically illustrates a method for processing bauxite residue according to an embodiment of the invention.

FIG. 4 schematically illustrates a sequence of steps in the method for the treatment of bauxite residue resulting from a process of bauxite treatment, according to a preferred embodiment of the present invention.

The process begins with the provision of a quantity of bauxite residue (1) together with the provision of a quantity of glass particles (2) such as approximately micron-sized particles of soda-lime glass. Suitable quantities of these initial materials are combined (3) into an aqueous paste and mixed until the aqueous paste comprises a substantially homogeneous mixture of both bauxite residue particles and glass particles.

The aqueous paste is then placed into a mould of a suitable or desired shape (e.g. a block or a brick shape) and is compressed by application (4) of a compressive pressure. The compressed block of mixture is then sintered (5) by heating the block to a temperature having a value within the range 800° C. to 1400° C. for a period of between 0.5 hours and 12 hours. The result (6) of this sintering process is a solid block of sintered mixture in which hazardous contaminant metals are significantly or substantially fully rendered less hazardous (or inert) within a glass matrix and re-crystallised minerals formed during this sintering process which permeates through substantially the whole of the sintered block.

It has been found that optimisation of this process can be achieved by optionally adding (2) suitable quantities of fines/particles of material (8) produced by the grinding (7) of blocks of the solid material produced by the sintering process described above. Optionally, at that step, lime may be added (8) to the aqueous paste (3) together with, or instead of, the fines if desired. In this way, the product of the process of the invention may be used as a seed input into the process itself in order to optimise the results achieved.

Figure 5:
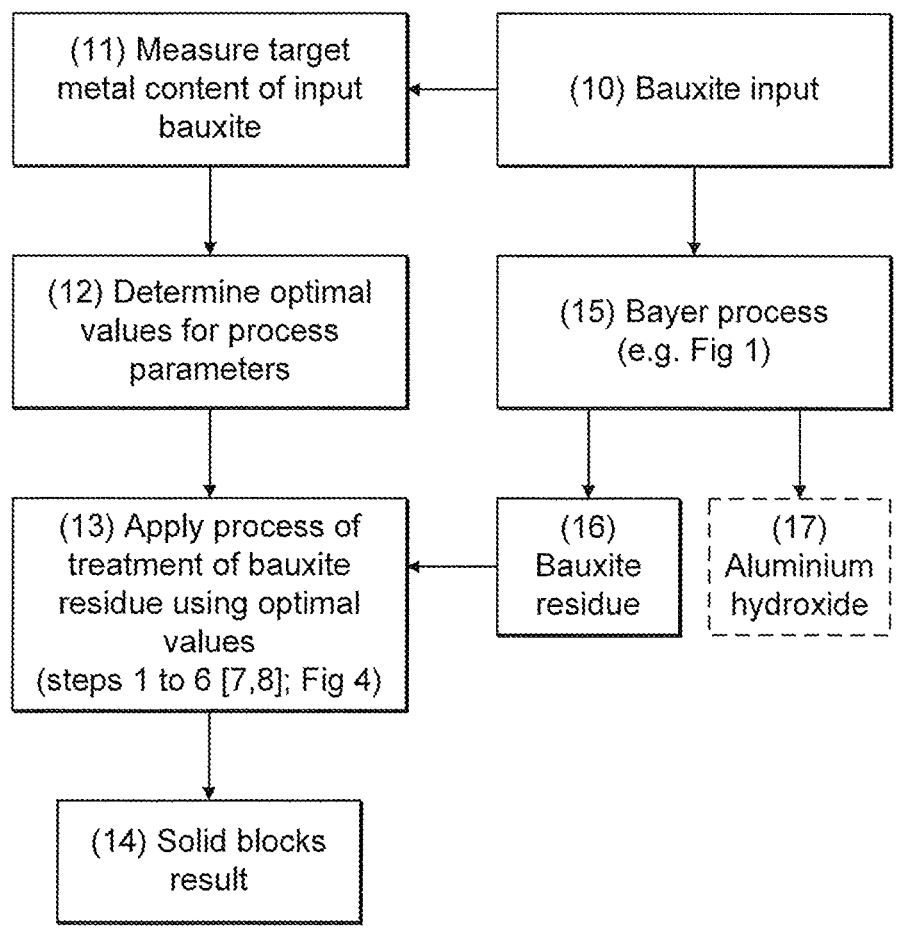
FIG. 5 schematically illustrates another method for processing bauxite residue according to an embodiment of the invention.

FIG. 5 schematically illustrates an application of the process described with reference to FIG. 4 in tandem with the processing of bauxite according to existing Bayer processing methodologies. As discussed above with reference to FIG. 1, the Bayer process begins with the provision and input of bauxite raw material (10). At this initial stage, the method according to the invention in the enhanced embodiment of FIG. 5 includes the initial step of measuring the composition of the input bauxite material (10) in order to determine the proportion (e.g. % weight) of target metal contaminants within the input bauxite.

It has been found that different target metal contaminants requiring toxicity reduction within the solid sintered products (e.g. blocks) produced according to the invention, may be better contained and rendered inert if the overall process is adapted/optimised according to the target metal in question. The result of the target metal measurement process (11) is output to a control unit containing a suitable database (e.g. Look-up Table) of process control parameters for use in the subsequent bauxite residue treatment process (13). Each process control parameter is matched to a particular proportion (e.g. % weight) of target metal contaminant within the input bauxite. The process control parameters include the relative quantity of bauxite residue and glass material (e.g. soda-lime glass particles), the optional quantity of additional additives (e.g. fines, lime), the degree of compression suitably applied to the mixture of bauxite residue and glass materials in order to produce the green body for subsequent sintering, and the sintering temperature and sintering duration to be applied to the green body. It has been found that these process control parameters may be varied in order to optimise the reduction of toxicity resulting from certain target metals/compounds within bauxite residue.

The process control parameters may preferably be values used previously to successfully process prior bauxite residue feed-stocks according to the invention. In this way, the process parameters that have been previously found to be successful in reducing toxicity associated with a particular target metal or compound (e.g. from amongst those listed in the WAC test BS EN 12457), when applied to a bauxite residue having a particular % content of that target material, are used to predict a suitable process parameter value for use in a current processing of new bauxite residue feed-stock. The prior values of control parameters, in association with corresponding target metal/compound input % values, may then be matched to the input % values of the same target metals/compounds found to be present within a new bauxite residue input. Those matched process parameter values may then be employed in the processing of the input bauxite residue, accordingly.

In preferred embodiments, the control unit (12) may identify the two closest-values for a particular process control parameter on the basis of a given input % value of a target metal/compound. These two closest values may be the process control parameter values associated with the two % target metal/compound values within the look-up table that 'bracket' the input % value—one being the closet lower value and the other being the closet higher value. The control unit may be arranged to interpolate a 'best estimate' value for each process parameter value between the two process parameter values associated with the bracketing % target metal/compound values within the Look-Up table.

The relevant control parameters retrieved from the control unit (12) are then input to the process (13) of the invention as described above with reference to FIG. 4. Accordingly, the process of bauxite residue treatment (13) may then be implemented. In particular, the process in question is applied to the bauxite residue (16) which is produced as part of the Bayer processing (15) of the self same bauxite input material from which the target metal content measurements (11) were derived initially. As a result, the treatment of bauxite residue applied according to this embodiment, is specifically adapted to the chemical properties of the bauxite input material which was the subject of the Bayer process that produced the bauxite residue in question. Because of this, the Bayer process (50) may produce not only aluminium hydroxide (17), but may also produce a bauxite residue (16) which may be optimally treated according to the present invention in order to produce solid blocks of substantially inert material suitable for use in the building and construction industries or otherwise.

Assessment Criteria

The product of the invention preferably satisfies suitable criteria to be classified as at least 'stable' or more preferably as 'inert'. A very widely accepted definition of 'stable' and 'inert' is one that meets the criteria of BS EN 12457 WAC (Waste Acceptance Criteria). This test assesses the contaminants which are leachable and it is used to evaluate materials prior to landfill acceptance. There is no widely used viable process for treating bauxite residue in the prior art that satisfies this 'inert' criteria when tested under the WAC test BS EN 12457. Historically it has proved extremely difficult, if not impossible, to obtain sufficiently low, or below-threshold, 'hazard' levels according to this criteria. The product produced according to the invention may be stable (e.g. 'Stable non-reactive hazardous waste and non-hazardous waste co-disposed with SNRHW' according to BS EN 12457) or 'inert' in respect of its content of one or more (or all) of the following materials: arsenic, mercury, molybdenum, chromium, lead, cadmium, selenium, chloride.

The present invention may convert bauxite residue to a stable, inert product with physical properties that are suitable for the manufacture of building products such as bricks, tiles, building panels and other valuable materials such as high performance aggregates, aggregates, proppants, railway ballast etc. Resistance to weathering, UV radiation, water, mild acids and alkalis, vermin etc. are all examples of physical properties that are suitable for the manufacture of building products and are achieved by the product of the invention. In preferred embodiments it may provide a solid product which satisfies the 'inert' criteria when tested under the WAC test BS EN 12457 and, therefore does not release harmful components through natural leaching during its use and consequently there will be little or no restriction in its end use on such grounds.

Addition of Ground Glass (e.g. Soda Lime Glass)

Finely ground consumer waste soda-lime glass, such as bottle glass, ground to grains of diameter <63 μm, is added to bauxite residue and processed to achieve a substantially homogeneous paste or slurry. The ground soda-lime glass can be added before or after filtration of the bauxite residue slurry output from the Bayer process.

The soda-lime glass may be clear or coloured. Currently, there is no large-volume use for post-consumer mixed, coloured soda-lime glass and, as a consequence, stocks of such glass are growing, at least in Europe. The addition of ground soda-lime glass lowers the eutectic melting temperature and makes melting the bauxite residue achievable at a lower temperatures and hence at lower fuel costs. The amount of soda-lime glass added will depend on both the source material and the intended end use/application.

Mixing with Additional Components

Additional components may be added to the mixture if desired. These additional components may be any one or more of the following:

(1) ground fines of the solid product produced by the treatment process of the present invention;

(2) optionally, lime (CaO).

The benefits/desirability of adding additional components may be determined according to the mineralogy and composition of the bauxite residue being treated. This will be largely dictated by the source of the raw input bauxite, and/or the source of the bauxite residue (i.e. the Bayer processing conditions) and the desired end use of the sintered product.

If required, fines 0% to 10% (by dry weight of the resulting mixture) from previous manufacture of sintered bauxite residue. Optionally, a quantity of lime may be added within the range 0% to 5% (by dry weight of the resulting mixture) are added to bauxite residue/ground soda-lime glass homogeneous paste/slurry and thoroughly mixed. An in-line mixer may be used. The choice and amount of additional component(s) (if any) for each source of bauxite residue may be selected to achieve an end product that will satisfy the inert criteria when tested under WAC test BS EN 12457.

The fines may be produced by design (i.e. specifically for use as an additional component) or may be created as a by-product of normal treatment method, in either way this being done according to the invention. The fines and/or the lime can be added before or after filtration of the red mud slurry output from the Bayer process. However, preferably, the addition of the additional component(s) should not interfere in obtaining a homogeneous mixture of bauxite residue and ground soda-lime glass.

Preparation for Sintering

The bauxite residue/ground soda-lime glass homogeneous paste, containing one or more additional component if desired, may be heated to achieve the desired consistency prior to sintering in order to present the material in the desired physical form to the sintering stage.

The paste may be presented for sintering in different physical forms depending on the end use of the sintered bauxite residue. This can include extrusion, compression, etc. or formed into tiles, pellets or bricks, etc. in order to achieve the end product in the desired state e.g. building materials may be as bricks or tiles, etc. whilst high performing aggregates may require a specific pellet/particle size/shape.

Figure 9:
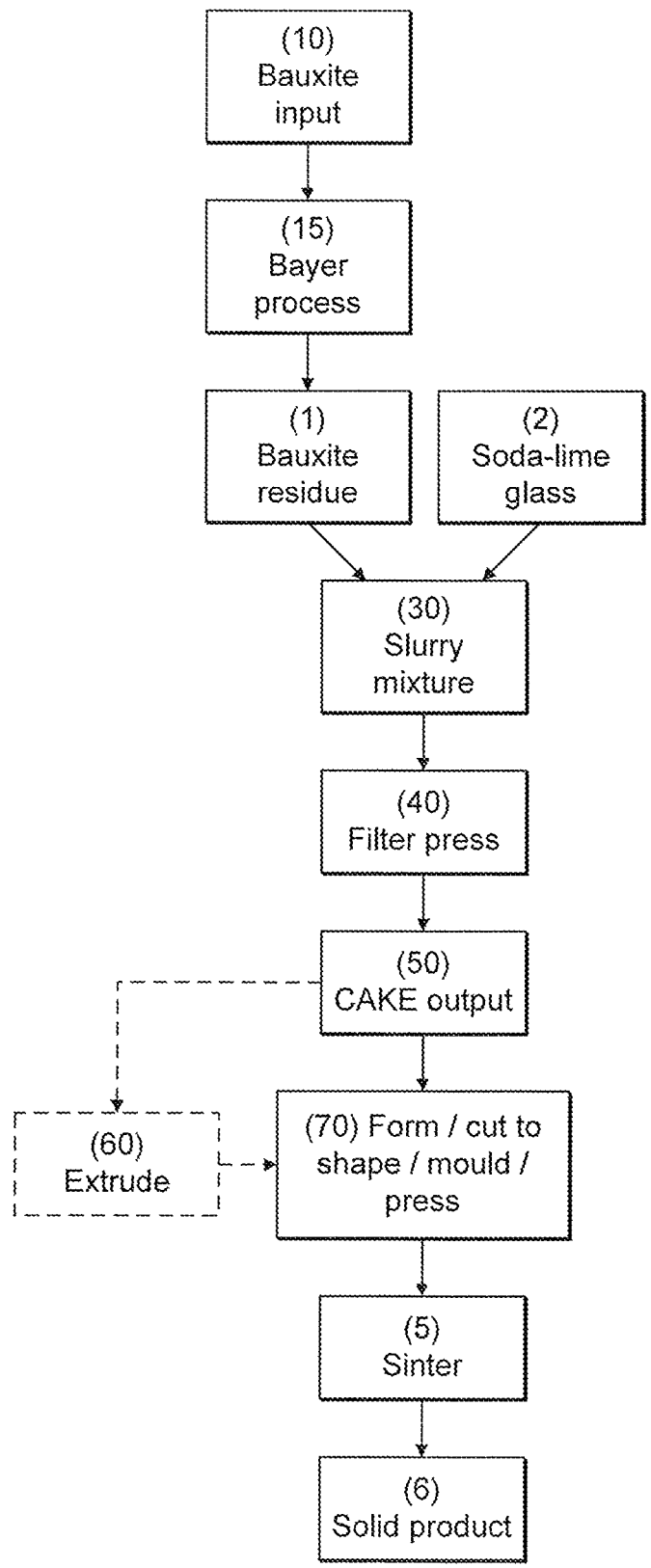
FIG. 9 schematically illustrates a method for processing bauxite residue according to an embodiment of the invention.

FIG. 9 schematically illustrates a variant of the process described above with reference to FIG. 4 in which bauxite residue is processed into a solid final product. Optional further aspects of the embodiment of FIG. 9 are illustrated with reference to FIG. 10 and FIGS. 11A to 11C. These matters concern examples of the manner in which the aforementioned mixture of bauxite residue and glass (e.g. soda-lime glass) may be processed to provide a green body suitable for sintering into the solid final product as described above.

In brief, bauxite residue (1) is produced as a slurry as a by-product of applying the Bayer process (15) to bauxite (10). A quantity of ground glass, e.g. soda-lime glass, (2) is then added to the slurry, as discussed elsewhere herein in detail, and the bauxite/glass mixture is mixed thoroughly to distribute the added glass throughout the bauxite slurry, resulting in a mixture slurry (30). This mixture slurry is then supplied at high pressure to a filter press (40) (see FIG. 10) where it is "de-watered" to produce a cake (50). This cake of mixed bauxite residue/glass is then processed by cutting/shaping (70) the cake into portions of desired shape and size each defining a 'green body' ready for sintering (5) in order to produce the final solid product (6.) Optionally, the raw cake (50) output from the filter pressing process (40) may be extruded prior to cutting/shaping (70).

Figure 10:
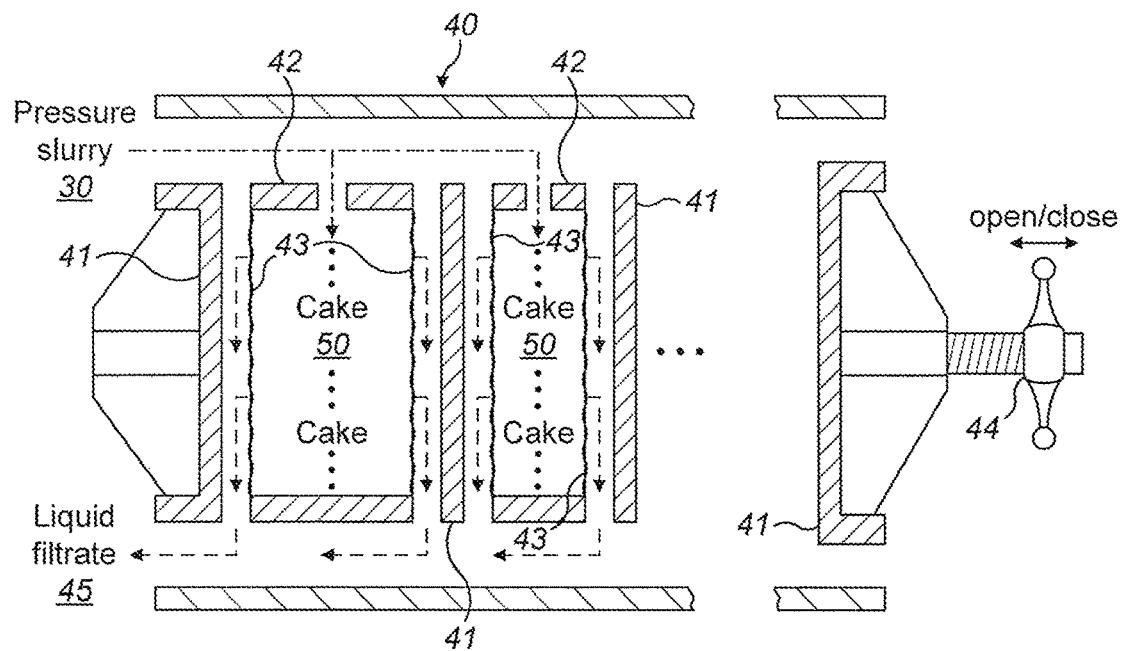
FIG. 10 schematically shows a filter press for forming a green body by a process of liquid/solid separation of a slurry according to an embodiment of the invention.

Referring to FIG. 10, this figure schematically illustrates the core elements of a device known as a "filter press". While reference is made herein to the use of a filter press, it is to be understood that other types of pressure filters for solid/liquid separation may be used, as appropriate for providing compacted cake. Examples include centrifuge filters, pressure filters, vacuum filters etc. such as would be readily apparent and available to the person skilled in this art. The "filter press" is a type of tool used in the art in solid/liquid separation processing using pressure. It is commonly used to remove ("de-water") liquid from fine particulate slurry typically encountered in mineral processing plants. The apparatus works on the principal of driving a slurry through a series of filters (e.g. cloth) under pressure (e.g. typically between about 2.5 atm and about 4 atm) to squeeze out water from the slurry, leaving behind a compacted, compressed body of de-watered material known in the art as "cake" or "filter cake". A filter press (40), suitable for use in an embodiment of the present invention, comprises a filtration chamber containing a filter pack (41, 42, 43) including a succession of filter frames separated by intermediate plates (41). Each filter frame carries a pair of filters (e.g. cloth sheets) (43) spaced to define between them an inner volume for receiving pressurised slurry (30) for de-watering.

A slurry pump (not shown) drives slurry (30) into the filter press via a slurry inlet opening of the filtration chamber in fluid communication with a slurry inlet opening of each filter frame allowing the pressurised slurry to enter the inner volume for de-watering. Liquid filtrate (45) passes through the filter sheets (43) and flows between a filter frame and an adjacent plate 41 to a liquid filtrate outlet opening of the filtration chamber. The result is the formation of a cake within the inner volume of each filter frame, between the filter sheets thereof, as slurry is de-watered. The pressure under which the filter cake is formed serves to compact or compress the material of the cake. It has been found that the consistency of the cake, resulting from de-watering of the bauxite residue and glass mixture, is comparable to that of modelling clay and is therefor firm enough to hold its shape when resting, yet malleable enough to be simply directly cut and/or pressed/moulded to portions shaped to provide a 'green body' ready for sintering. Examples of this are shown in FIGS. 11A to 11C.

Direct access to the filter cake is achieved by opening a terminal plate (44) of the filtration chamber to reveal the filter frames therein and the cake within them. Each filter frame (42) and intermediate plate (41) is moveable to allow the cake to be removed from the filter frames and processed as desired.

Figure 11A:
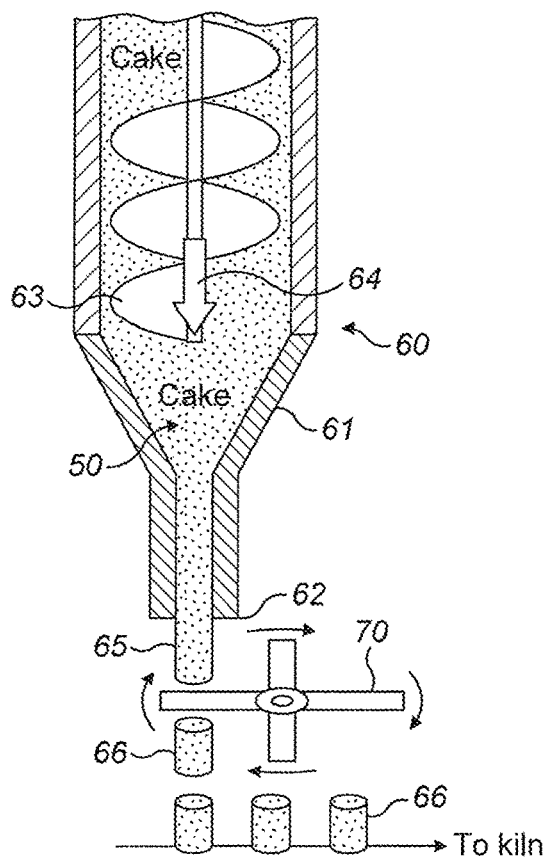
FIG. 11A schematically shows a process for forming a shaped green body by extrusion of a cake produced by e.g. the filter press of FIG. 10.

Manipulation of the cake material to form a green body, or a multitude of them, may include forcing the cake through an extrusion nozzle (62) of an extruder apparatus (60) shown schematically (and simplistically) in FIG. 11A. Cake (50) may be driven though an extruder chamber (61) by an auger drive screw (63), or the like, towards the extrusion nozzle (62) and subjected to compression pressure (64) in the process. The extruded, compacted cake (65) may then be directly cut into portions (66) by the rotating blades (70) of a rotary cutter positioned adjacent the extrusion nozzle outlet for this purpose. The longitudinal profile of the portions (66) is defined by the profile of the extrusion nozzle outlet, and the length of each portion is defined by the rate of extrusion of the extruded cake (65) and the rate of rotation of the blades (and the number of them) of the rotary cutter. The resulting portions of cake (66) are each a 'green body' ready for sintering, and may be conveyed to a kiln (e.g. a calciner) for sintering.

Figure 11B:
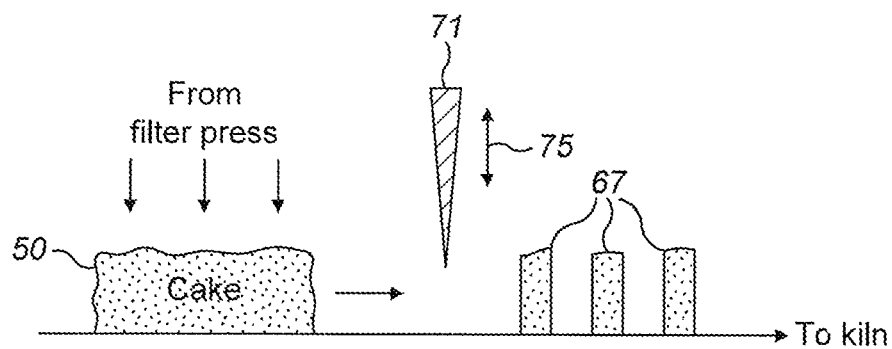
FIG. 11B schematically shows a process for forming a shaped green body by cutting a cake produced by e.g. the filter press of FIG. 10.
Figure 11C:
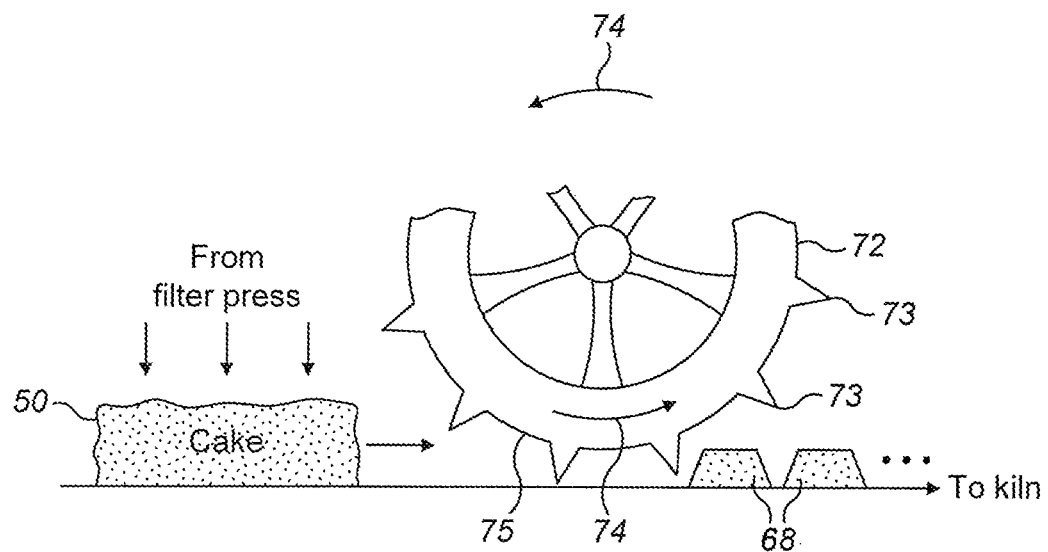
FIG. 11C schematically shows a process for forming a shaped green body by pressing/moulding and cutting a cake produced by e.g. the filter press of FIG. 10.

FIGS. 11B and 11C schematically illustrate alternative (or additional) methods for processing cake (50) output from a filter press. This may comprise placing the cake on a conveyor and conveying the raw cake to a cutter for cutting the cake into portions of desired size and shape. The cut portions thereby each provide a 'green body' (67) and may be conveyed, continuously, towards a kiln for sintering.

Cutting may be by simply directly cutting the raw cake using one or more cutter blades (71) each arranged over the conveyor to execute a reciprocating motion (indicated by arrows 75) to cut the conveyed raw cake (50) into portions.

FIG. 11C shows a variant of this arrangement in which the reciprocating cutter blade (71) is replaced by a rotating cutter wheel (72), which may also serve as a shaping press. The rotating cutter wheel comprises a circular wheel positioned above the cake conveyor with its axis of rotation traversing over the conveyor surface such that raw cake is conveyed thereunder by the conveyor. The circumference of the rotary cutter wheel presents a series of radially extending cutting edges or blades (73) arranged in regular array therealong and dimensioned so as periodically to osculate with, or make a close approach to, the conveyor surface as the rotary blade is rotated in use in a direction (74) and angular speed selected such that an osculating/closest cutting edge has a velocity substantially matching that of the conveyor surface bearing the cake.

A spacing between neighbouring cutting edges provides a recessed volume (75) defining a mould or press for accommodating the piece of cake that had been cut by the cutting edges of the cutter wheel and separated from a main body of cake (50) initially input to the rotary cutter wheel. If the thickness of the input body of raw cake (i.e. its height above the conveying surface of the conveyor) is arranged to exceed the depth of the mould or recess (75) then the act of cutting a piece of cake also presses/compresses the piece and moulds it into the shape defined by the moulding recessed volume (75). This shape may be any desired shape, so as to define 'green body' (68) pre-formed into the desired shape of the final solid body produced once the green body is subsequently sintered e.g. the shape of any one of: a brick, a briquette, a pellet, a tile, a beam, an ingot, or other desired shape. A cutting edge (73) may be a closed edge defining a closed perimeter surrounding the recessed volume (75) (e.g. conceptually in the manner of a biscuit cutter).

In alternative arrangements, either one or both of these cutting operations may be applied to the extruded, cut portions of cake (66) output from extruder (60) of FIG. 11A, or may be applied to the extruded cake (65) output from the extruder (60) instead of cutting by the rotary cutter e.g. the extruded rope of cake may be horizontally conveyed to the blade (71) or blade/press (72) for cutting.

In yet a further embodiment, the filter press may be a so-called "recessed plate filter press". Such filter presses contain elements defining recessed, concave depressions of relatively small dimensions (e.g. 50 cm across) in which the compressed filter cake can accumulate under the process of filter pressing described above. The shaping and dimensions of these recessed concavities acts as a mould for pre-shaping the filter cake into a green-body ready for sintering without the need for further cutting or moulding.

Sintering Cycle

The sintering cycle may vary depending on the source of bauxite residue, the additional components included (if any) and the end use of the sintered product. However, most sintering cycles will hold at a temperature between 800° C. and 1400° C., and preferably between 1100° C. and 1400° C. for between 0.5 hours and 10 hours.

The sintering cycle can be performed as a batch-wise or as a continuous process. A tunnel kiln, box/oven kiln, pendulum kiln, vertical kiln or rotary calciner may be used, with the latter two being the preferred apparatus for sintering.

During the sintering cycle the colour of material gradually changes from red to black and achieves a homogeneous composition and appearance throughout the sintered product.

Cooling Cycle

The sintered material is cooled in a controlled way to reduce product degradation, deformation or impairment. Cooling will be carried out on a continuous basis using either rotating tube air coolers after a tube calciner. Alternatively for brick tile and pipe manufacture batch or continuous static kilns will be used. Recovered heat may be returned to the air intake of the calciner or kiln to improve efficiencies.

EXAMPLE

A sample of bauxite residue was taken from a European manufacturing plant using a source of bauxite from Africa. The process according three differing embodiments of the invention was applied to the sample of bauxite residue as follows:

| Process No. 1 - | 0% soda-lime glass added; | No Compression; | 1100° C. sintering. |
|---|---|---|---|
| Process No. 2 - | 5% soda-lime glass added; | Compression applied; | 1100° C. sintering. |
| Process No. 3 - | 5% soda-lime glass added; | Compression applied; | 1000° C. sintering. |
| Process No. 4 - | 10% soda-lime glass added; | Compression applied; | 1200° C. sintering. |

In Process No. 2 compression was applied by manually pressing the mixture (bauxite residue+glass) when within a 100 mm square steel mould to compress the mixture. It is therefore considered to be a "low" compression comparative example. In Process No. 3 and Process No. 4, compression was applied by mechanically pressing the mixture (bauxite residue+glass) when within the 100 mm square steel mould to compress the mixture. This compression was applied using a 15-tonne press having a 47.7 mm piston. These are therefore considered to be a "high" compression comparative examples. The solid product resulting from each one these processes was then crushed and analysed according to the WAC test BS EN 12457. The results are shown in Table 2. For comparison, a raw reference sample of the same bauxite residue was also analysed according to the WAC test BS EN 12457. This is referred to as "Reference process No. 1" in which no glass, no compression and no sintering was applied.

It can be seen that each one of processes No. 2 to No. 4 result in the conversion of a bauxite residue which is "Unsuitable" for any waste disposal, into a product that is wholly "Inert" in terms of its arsenic content. Processes No. 2 also reduces chromium levels from "Hazardous" to "Stable".

Figure 7:
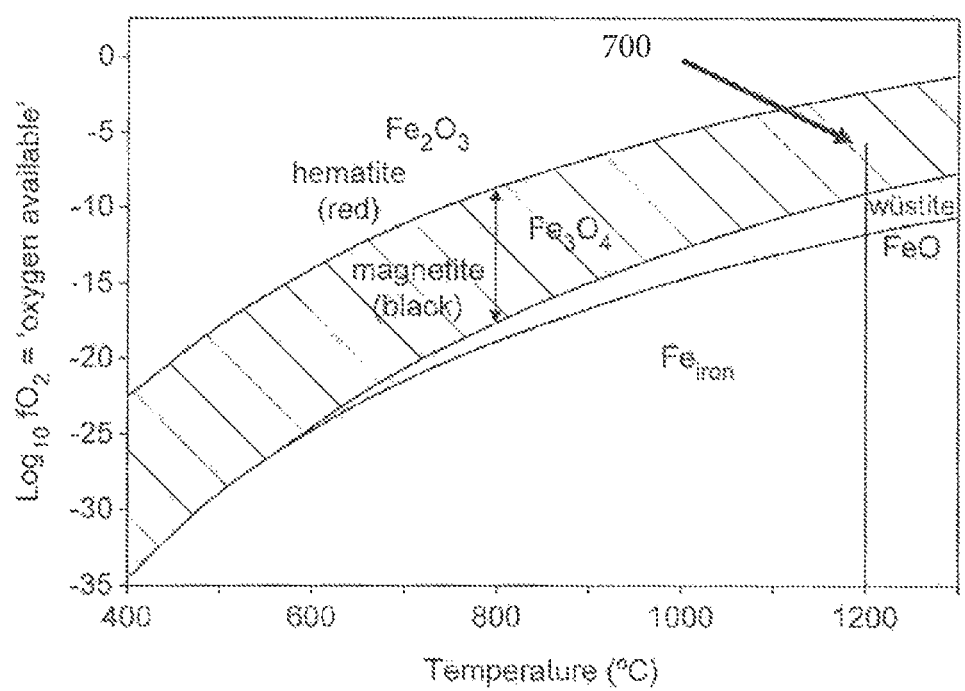
FIG. 7 graphically shows a process of amorphous glass formation from Hematite.

Notably, processes No. 3 and No. 4 each render all listed materials as "Inert". Table 3 lists a comparison of the differences as between processes No. 2 to No. 4 as compared to Reference Process No. 1. The percentage reduction in arsenic, chromium and molybdenum is listed, in which a percentage reduction ($P_i$) according to process No. "i" (i=2, 3, 4) relative to Reference Process No. 1, is defined in terms of the measure mg/kg value ($X_i$) of a stated element obtained from process No. "i" (i=2, 3, 4) and the corresponding value ($X_1$) obtained using Reference Process No. 1, as follows:

$$P_i = 100 \times \frac{X_1 - X_i}{X_1}$$

proposed that this may be due to iron oxide minerals having been altered from hematite to magnetite. The alteration can be shown on the oxygen fugacity—temperature diagram of FIG. 7, as a process of reduction along a path similar to that shown by the black arrow 700 in FIG. 7.

TABLE 2

WAC Results for Sample
(BS EN 12457-3 Values (mg/kg) at L:S 10:1)

| Element | Reference Process No. 1 (mg/kg) | Process No. 2 (mg/kg) | Process No. 3 (mg/kg) | Process No. 4 (mg/kg) | Inert (mg/kg) | Stable (mg/kg) | Hazardous (mg/kg) | **Unsuitable (mg/kg) |
|---|---|---|---|---|---|---|---|---|
| As | 32 | 0.17 | 0.15 | 0.11 | 0.5 | 2 | 25 | >25 |
| Ba | 1.2 | 0.23 | 0.032 | <0.10 | 20 | 100 | 300 | >300 |
| Cd | <0.002 | <0.0010 | <0.0010 | <0.0010 | 0.04 | 1 | 5 | >5 |
| Cr | 13 | 4.8 | 0.22 | 0.21 | 0.5 | 10 | 70 | >70 |
| Cu | 0.82 | 0.035 | <0.100 | 0.018 | 2 | 50 | 100 | >100 |
| Hg | 0.01 | 0.0017 | 0.0014 | 0.0033 | 0.01 | 0.2 | 2 | >2 |
| Mo | 0.65 | 0.2 | 0.018 | 0.04 | 0.5 | 10 | 30 | >30 |
| Ni | 0.08 | <0.20 | <0.20 | <0.20 | 0.4 | 10 | 40 | >40 |
| Pb | 2.4 | 0.95 | <0.100 | <0.10 | 0.5 | 10 | 50 | >50 |
| Sb | 0.09 | 0.11 | <0.060 | <0.060 | 0.06 | 0.7 | 5 | >5 |
| Se | <0.2 | <0.10 | <0.100 | <0.10 | 0.1 | 0.5 | 7 | >7 |
| Zn | 7 | 0.045 | <0.25 | 0.68 | 4 | 50 | 200 | >200 |
| $Cl^-$ | <70 | <30 | <30 | <30 | 800 | 15000 | 25000 | >25000 |
| F | <6 | I/S | <2.0 | <2.0 | 10 | 150 | 500 | >500 |
| $SO_4^{2-}$ | 40 | 170 | 3.5 | 21 | 1000 | 20000 | 50000 | >50000 |
| (TDS) | 5300 | 5400 | 400 | 400 | 4000 | 60000 | 100000 | >100000 |
| Phenol Index | <1 | <1.0 | <1.0 | <1.0 | 1 | | | |
| (DOC) | 100 | 19 | 12 | 10 | 500 | 800 | 1000 | >1000 |

*I/S =too small to measure.
** Column added by applicant - material exceeding the WAC test threshold for 'hazardous waste' by definition must be processed in order to be accepted for land-fill disposal.

TABLE 3

A Comparison of Differences between Processes

| Processes Compared | Difference | % As reduced* | % Cr reduced* | % Mo reduced* |
|---|---|---|---|---|
| No. 1 & No. 2 | Low Compression; 5% glass; 1100° C. sintering | 99 | 63 | 69 |
| No. 1 & No. 3 | High Compression; 5% glass; 1000° C. sintering | 100 | 98 | 97 |
| No. 1 & No. 4 | High Compression; 10% glass; 1200° C. sintering | 100 | 98 | 94 |

*The % values are given to the nearest whole number

End Product Chemical Properties

The sintered product satisfies appropriate end use product application tests. It also satisfies the inert classification when tested under WAC test BS EN 12457, therefore, it can be stored and used with minimal restrictions with respect to ground contamination.

Mineralogy and Amorphous Glass

Figure 6:
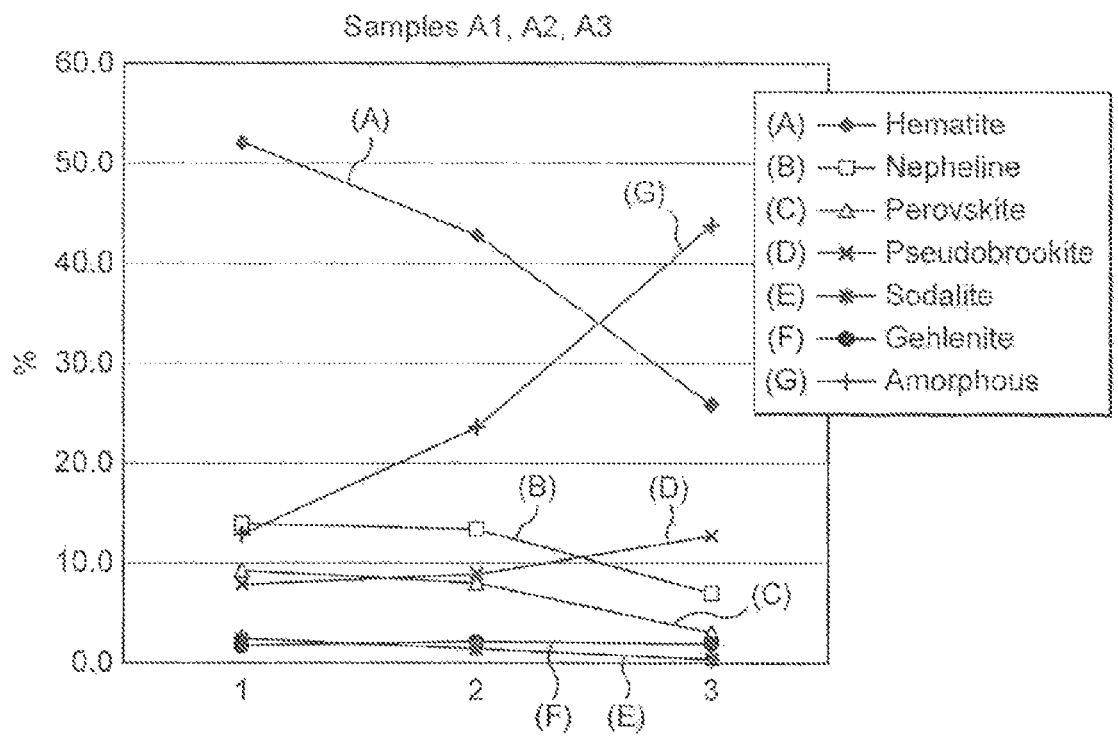
FIG. 6 shows the change in mineralogy of a sintered solid product according to some example embodiments of the invention.

Three identical samples of a green body were prepared as described above using the same bauxite residue and with the same proportion of added soda-lime glass, and each compressed to form a green body. These three samples were heated to 1100° C. (Sample A1), 1150° C. (Sample A2) or 1200° C. (Sample A3) and kept at that temperature for 10 hours, according to the process of the present invention. FIG. 6 and Table 4 show the resulting change in the mineralogy of the sintered solid product produces in each case.

The resulting solid product lost the red colour of bauxite residue, and became black with some magnetism. It is The amorphous content of these samples increases with sintering temperature and may be considered to include a 'glass' resulting from melting of some of the mineral constituents. The lower melting temperature minerals, especially hematite ($Fe_2O_3$), with minor contributions from nepheline, perovskite and sodalite, have been partially destroyed to create a glass. Rapid cooling (quenching) prevents crystal formation to give a glassy or amorphous product without crystalline structure.

TABLE 4

Change in Mineralogy of Sintered Solid Product

| Mineral | Initial Melting point (° C.) | Sample A1 (1100° C.) Mineral % | Sample A2 (1150° C.) Mineral % | Sample A3 (1200° C.) Mineral % |
|---|---|---|---|---|
| Hematite | 678 | 51.9 | 42.5 | 25.8 |
| Nepheline | 850-1254 | 14.0 | 13.4 | 7.0 |
| Perovskite | 1960 | 9.2 | 8.0 | 3.0 |
| Pseudobrookite | 585-1200 | 7.8 | 8.9 | 12.6 |
| Sodalite | 1100 | 2.4 | 1.3 | 0.4 |
| Gehlenite | 1590 | 1.9 | 2.1 | 2.0 |
| Amorphous | — | 12.7 | 23.5 | 43.6 |
| Quartz | 870 | — | 0.3 | — |
| Pyroxene | — | — | — | 2.0 |
| Plagioclase | 1100-1550 | — | — | 3.7 |
| Total | 678 | 99.9 | 100.0 | 100.1 |

Process Optimisation

The process of forming a laterite and the Bayer process both remove large amounts of elements (especially silicon and aluminium) from the original rock. This results in an increase in concentration of what is left, including metals.

This concentration may be at least ×3 overall and could be as much as ×10 above the natural concentration in the original rock.

In the original rock the metals are typically distributed in small minerals throughout the body of the rock and also gathered in higher concentrations into veins, lodes or layers. In the rock the metals were likely to be present levels of a few mg/kg, in the veins, lodes or layers the concentrations could rise to a few percent. The size of the veins, lodes or layers could be from 0.5 m to 20 m. These figures are approximate with the intention of demonstrating the practical circumstances—individual examples could be larger or smaller.

Thus, the distribution of the metals in the original rock is highly irregular. When the laterite (known as bauxite when the Al content is high, normally when the alumina content exceeds 32%) is formed it would typically have followed the metal irregularities of the original rock. Presence of silicon is closely monitored as it locks up soda. When the laterite (bauxite) is quarried for its Al and Si content, there is generally no interest in the content of other metals and the bauxite is only monitored for its Al and silicon content during mining, with no analyses of other metals. Thus, during mining, no attempt is made to avoid metal totspots' and probably no knowledge of where they occur. The irregularities in metal content are small in size compared to the scale of mining. There is no intentional attempt at homogenisation. The overall result is that one can expect great variations in the content of metals within a bauxite feed-stock.

The metals within a bauxite sample will typically be grouped together (Cu, Pb, Zn, for example) but not all the metals may have occurred in the same vein, lode or layer. For example, U and Th usually occur together but separate from the other metals. South American/Caribbean bauxite tends to have a higher Th and U content. Radon is also likely to be present. For example, radioactivity levels in bauxite samples due to naturally-occurring radon (Ra-226) may be of the order of 180-190 Bq/kg, and levels due to naturally-occurring thorium (Th-232) may be of the order of 130-140 Bq/kg. However, most notably, it has been found that, by heating bauxite residue to a temperature of about 1000° C. or more, radon (Ra-226) and thorium (Th-232) exhalation levels can be effectively reduced to a value of approximately one tenth (or less) that of the exhalation levels of the original (un-sintered) bauxite residue. This is especially beneficial when producing building materials by a process according to the present invention.

Figure 8A:
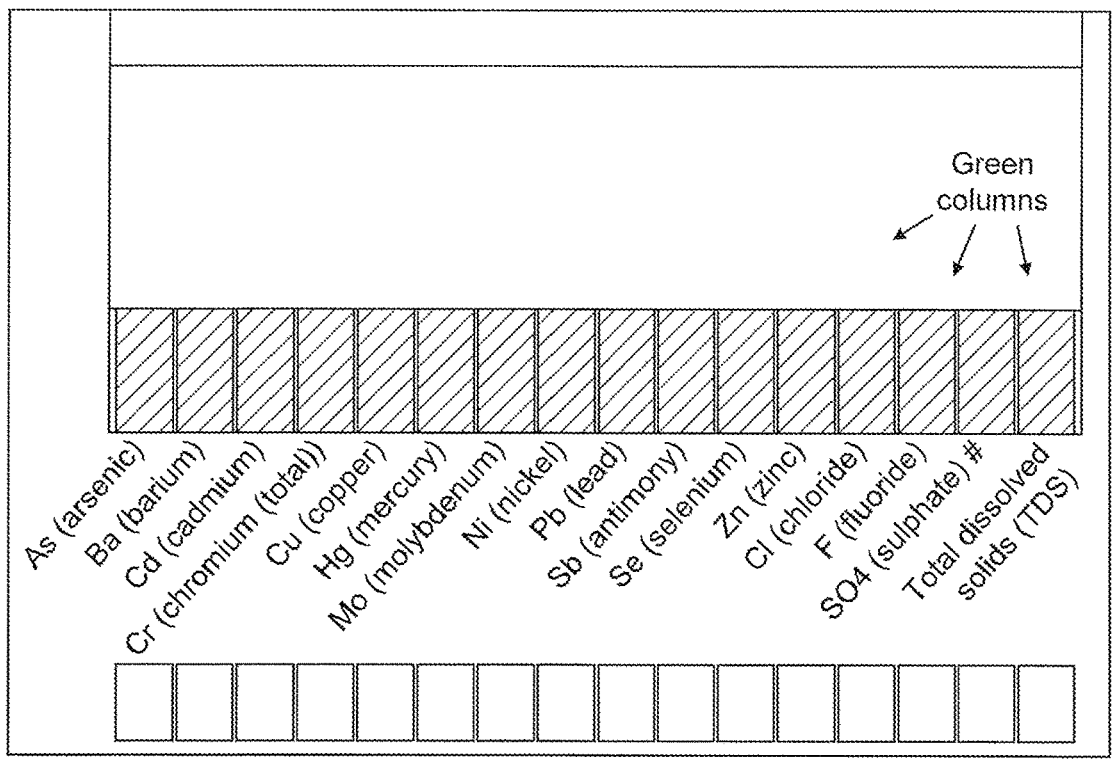
FIGS. 8A, 8B and 8C show examples of a graphical user interface according to an embodiment of the invention.
Figure 8B:
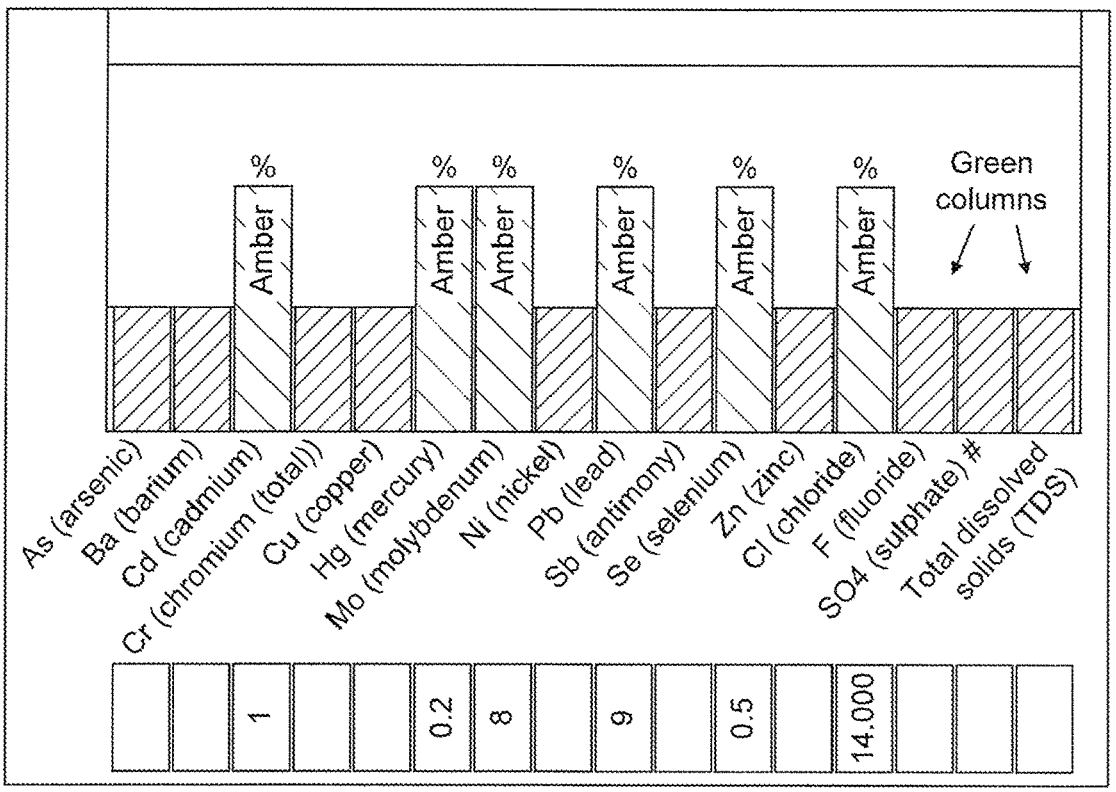
Figure 8C:
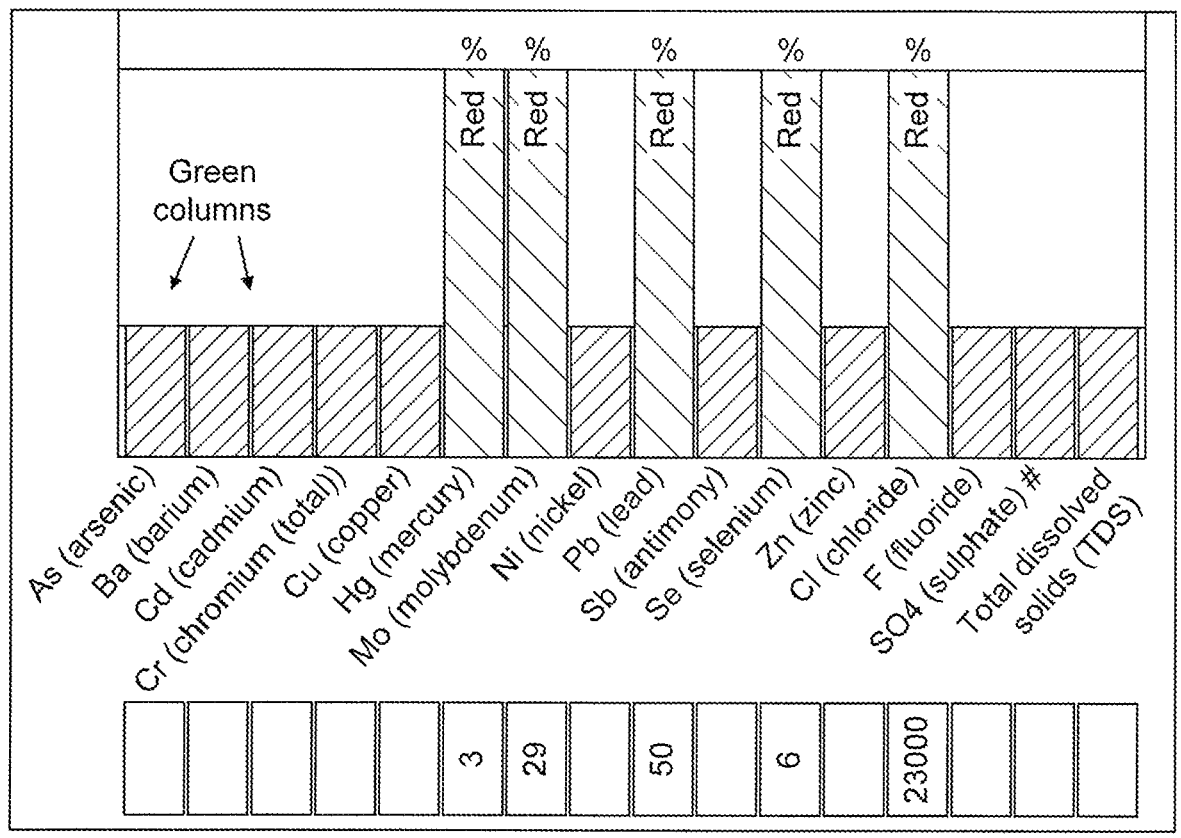

FIGS. 8A to 8C show a graphical user interface (GUI) according to an embodiment of the invention. The control unit (FIG. 5, item 12) may generate a display on a GUI for display to a user/controller of a process plant according to the invention. A first display screen (FIG. 8A) displays a horizontal list of target metals and compounds below which e.g. rectangular display boxes are horizontally arranged in a linear array. Once a new input feed-stock of bauxite (10) has been analysed (11) to determine its % content of target metals/compounds, the control unit is arranged to receive (as an input) and use that compositional information to determine whether or not the currently-used process control parameters employed in the process (13) of bauxite residue treatment, are likely to be suitable for use with the new bauxite feedstock.

Using the stored pre-determined % values of target metal/compound % content, contained within the Look-up Table of the control unit, and the values of process control parameters that were used in the past successfully to process the bauxite residue according to the process of the invention, the control unit is arranged to find the process control parameter values that will be required to process the new bauxite feed-stock in order to produce a final solid product (of the invention) with suitably lowered toxicity (e.g. 'inert'). The calculated values of the process parameters deemed to be required are then compared to the process parameter values currently in use. If the difference is sufficiently large to prevent a suitable solid product being produced by the treatment process, using the current process control parameters, then the GUI displays this as a warning in the form of fully-extended (e.g. red-coloured) columns, such as shown in FIG. 8C, associated with the target materials which are likely to remain at undesirable levels within the solid product. Otherwise, the GUI displays shorter columns extended in proportion to the predicted % target material content in the final product, as shown in FIG. 8B. The columns are preferably colour coded (e.g. amber) to indicate target materials which are likely to be reduced to desirable/acceptable levels within the final solid product. This is shown in FIGS. 8B and 8C—the target materials being: Cd, Hg, Mo, Pb, Se, and Cl.

The examples and embodiments provided herein are intended to aid an understanding of the invention and are not intended to limit the scope of the invention. Modifications, variants and equivalents of elements of the embodiments described herein, such as would be readily apparent to the skilled person, are intended to be encompassed by the scope of the invention such as is defined, for example, by the claims.

The invention claimed is:

1. A process of bauxite treatment comprising:
   receiving bauxite;
   measuring the proportion of one or more target substance(s) within the chemical composition of the received bauxite, the target substance(s) being a substance(s) selected from: arsenic (As), mercury (Hg), molybdenum (Mo), chromium (Cr), lead (Pb), cadmium (Cd), selenium (Se), chloride (Cl—);
   processing the received bauxite according to a Bayer process of bauxite treatment and therefrom producing a bauxite residue; and
   treating the bauxite residue by mixing a quantity of the bauxite residue with a quantity of a glass material to form a mixture;
   compressing the mixture to form a green body;
   sintering the green body; and
   cooling the sintered green body thereby to produce the solid product;
   wherein the quantity of a glass material, and/or the sintering temperature, and/or the sintering period of time are determined according to the measured proportion of the one or more target substances within the chemical composition of the received bauxite.

2. A process according to claim 1 wherein at least said quantity of glass material is determined according to a said measured proportion of said one or more target substances within the chemical composition of the received bauxite.

3. A process according to claim 1 wherein said compressing includes applying a compressive pressure determined according to a said measured proportion of said one or more target substances within the chemical composition of the received bauxite.

4. A process according to claim 1 wherein at least said sintering temperature is determined according to a said measured proportion of said one or more target substances within the chemical composition of the received bauxite.

5. A process according to claim 1, said method of treatment further comprising mixing a quantity of fines with said quantity of bauxite residue and said quantity of glass material thereby to form said mixture, wherein the fines are a result of crushing a preliminary solid product formed by the process of:
- mixing a preliminary quantity of bauxite residue with a preliminary quantity of glass material to form a preliminary mixture;
- compressing the preliminary mixture to form a preliminary green body;
- sintering the preliminary green body; and,
- cooling the sintered preliminary green body thereby to produce the preliminary solid product;
- and wherein said quantity of fines is determined according to a said measured proportion of said one or more target substances within the chemical composition of the received bauxite.

6. A process according to claim 1 wherein said glass material comprises a soda-lime glass.

7. A process according to claim 1 wherein said temperature of sintering is between about 800° C. and about 1400° C.

8. A process according to claim 1 wherein said compressing comprises compressing said mixture under a compressive pressure of a least 10 MPa.

9. A process according to claim 1 wherein said quantity of bauxite residue is between about 90% by weight and about 99.5% by weight of the resulting mixture and said quantity of glass material is between about 10% by weight and about 0.5% by weight of the resulting mixture, on a dry weight basis of the resulting mixture.

10. A process according to claim 1 including forming an aqueous paste comprising said mixture, wherein said bauxite residue and said a quantity of glass material are substantially homogeneously mixed throughout said paste, and said compressing comprises compressing said aqueous paste.

11. A process according to claim 1, further comprising mixing a quantity of fines with said quantity of bauxite residue and said quantity of glass material thereby to form said mixture, wherein the fines are a result of crushing a said solid product.

12. A process according to claim 11 wherein said quantity of bauxite residue is between about 90% by weight and about 95% by weight of the resulting mixture and the quantity of glass material and fines comprised within the material making up the rest of the mixture, on a dry weight basis of the resulting mixture.

* * * * *